United States Patent
Egbers et al.

(10) Patent No.: US 9,447,816 B2
(45) Date of Patent: Sep. 20, 2016

(54) BEARING ASSEMBLY

(71) Applicant: Schaeffler Technologies AG & Co. KG, Herzogenaurach (DE)

(72) Inventors: Johann Egbers, Herzogenaurach (DE); Harald Meisel, Baiersdorf (DE); Jianchang Zhang, Shanghai (CN); Yanbin Shen, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/715,985

(22) Filed: May 19, 2015

(65) Prior Publication Data

US 2015/0345549 A1 Dec. 3, 2015

(30) Foreign Application Priority Data

May 30, 2014 (CN) .......................... 2014 1 0240749

(51) Int. Cl.
| | |
|---|---|
| *F16C 19/06* | (2006.01) |
| *F16C 41/00* | (2006.01) |
| *F16C 33/72* | (2006.01) |
| *F16C 27/04* | (2006.01) |

(Continued)

(52) U.S. Cl.
CPC ................ *F16C 19/06* (2013.01); *D01H 1/00* (2013.01); *F16C 19/08* (2013.01); *F16C 25/083* (2013.01); *F16C 27/04* (2013.01); *F16C 33/723* (2013.01); *F16C 35/12* (2013.01); *F16C 41/002* (2013.01); *F16C 2340/18* (2013.01)

(58) Field of Classification Search
CPC ...... F16C 19/06; F16C 19/08; F16C 25/083; F16C 27/04; F16C 33/723; F16C 35/12; F16C 41/002; F16C 19/54; F16C 19/546; F16C 19/28; F16C 2340/18; D01H 1/00
USPC ....... 384/489, 493, 504, 517–520, 537, 546, 384/563, 465
See application file for complete search history.

(56) References Cited

U.S. PATENT DOCUMENTS

| | | | | |
|---|---|---|---|---|
| 1,364,675 | A | * | 1/1921 | Almfelt .................. B23Q 1/265 384/504 |
| 2,991,926 | A | * | 7/1961 | Diefenderfer ........... F01D 25/16 415/180 |
| 4,721,441 | A | * | 1/1988 | Miyashita ............. F01D 25/164 384/518 |

(Continued)

FOREIGN PATENT DOCUMENTS

| | | | |
|---|---|---|---|
| DE | 102010035665 A1 * | 3/2012 | ........... F01D 25/164 |
| JP | 03277819 A * | 12/1991 | |

(Continued)

*Primary Examiner* — Marcus Charles
(74) *Attorney, Agent, or Firm* — Volpe and Koenig, P.C.

(57) ABSTRACT

A bearing assembly, including: a housing having a through hole; first and second bearings coaxially set in the through hole, the first bearing is located at one end and the second bearing is located at an other end of the through hole, and both the first and second bearings include inner and outer rings. A first shaft sleeve is set between the first and the second bearing along an axial direction. An end cap located at the other end of the through hole, is connected with the housing and adapted to rotate relatively to the housing. The first bearing is located between the end cap and the first shaft sleeve along the axial direction. Accordingly, the end cap can be connected with the housing for preventing the end cap from falling out of the housing, thus the bearing assembly is configured into an integrated piece for transportation and usage.

11 Claims, 4 Drawing Sheets

(51) Int. Cl.
  *D01H 1/00* (2006.01)
  *F16C 35/12* (2006.01)
  *F16C 19/08* (2006.01)
  *F16C 25/08* (2006.01)

(56) References Cited

U.S. PATENT DOCUMENTS

| | | | | |
|---|---|---|---|---|
| 4,949,368 A * | 8/1990 | Kubo | ............... | H01J 35/101 378/132 |
| 5,253,985 A * | 10/1993 | Ruetz | ............... | F01D 25/164 384/473 |
| 5,518,322 A * | 5/1996 | Hicks | ............... | B60B 33/00 384/492 |
| 6,309,109 B1 * | 10/2001 | Chuang | ............... | F16C 19/54 384/499 |
| 6,443,624 B1 * | 9/2002 | Knepper | ............... | C21D 1/06 384/465 |
| 7,025,579 B2 * | 4/2006 | Woollenweber | ............... | F01D 15/10 384/490 |
| 7,371,011 B2 * | 5/2008 | McKeirnan, Jr. | ............... | F01D 25/16 384/504 |
| 7,377,695 B2 * | 5/2008 | Qiu | ............... | F16C 19/54 378/132 |
| 7,461,979 B2 * | 12/2008 | Mavrosakis | ............... | F01D 25/16 384/462 |
| 7,677,041 B2 * | 3/2010 | Woollenweber | ............... | F01D 25/16 384/452 |
| 8,602,655 B2 * | 12/2013 | Tabata | ............... | F01D 5/027 384/490 |
| 8,807,840 B2 * | 8/2014 | House | ............... | F01D 25/16 384/476 |
| 2003/0223665 A1 * | 12/2003 | Niebling | ............... | F16C 33/76 384/448 |
| 2008/0019629 A1 * | 1/2008 | McKeirnan | ............... | F16C 35/077 384/493 |

FOREIGN PATENT DOCUMENTS

JP            04113022 A   *   4/1992
JP       2013217436 A   *   10/2013

* cited by examiner

BEARING ASSEMBLY

INCORPORATION BY REFERENCE

The following documents are incorporated herein by reference as if fully set forth: Chinese Patent Application No. 201410240749.2, filed May 30, 2014.

FIELD OF THE INVENTION

The present disclosure generally relates to the field of bearings, and more particularly, to a bearing assembly for fliers of textile machinery.

BACKGROUND

Bearing assemblies for fliers are widely used in textile machineries, such as in a roving machine. The bearing assembly is generally installed on the textile machinery for a rotating shaft. Referring to FIG. 1, an existing bearing assembly together with a rotating shaft 7 mounted thereon is illustrated. The bearing assembly includes: a shaft sleeve 5 and a housing 1 which are coaxially and successively sheathed outside the rotating shaft 7; two deep groove ball bearings 4 coaxially set on both ends of the shaft sleeve 5, respectively; an end cap 2 coaxially set inside the housing 1 at one end the housing 1, wherein the deep groove ball bearing 4 close to the end where the end cap 2 located is set between the shaft sleeve 5 and the end cap 2; and the inside wall of the housing 1 is provided with snap springs 6 which are respectively pressed against the deep groove ball bearings 4 at ends away from the shaft sleeve 5, so as to limit positions of the deep groove ball bearings 4 along the axial direction of the bearing assembly. The deep groove ball bearings 4 each include an inner ring 41 and an outer ring 42.

The rotating shaft 7 has an end which has an external diameter larger than an inner diameter of the end cap 2. During installation of the bearing assembly to the roving machine, the rotating shaft 7 passes through the end cap 2 and the deep groove ball bearings 4, successively, until the end of the rotating shaft 7 stands against an end of the end cap 2 away from the shaft sleeve 5, thus limiting position of the end cap 2 along the axial direction.

However, the bearing assembly as recited above has following drawbacks: the rotating shaft 7 is required for limiting position of the end of the end cap 2 away from the shaft sleeve 5 along the axial direction. In other words, before the bearing assembly is mounted on the rotating shaft 7, position of the end cap 2 along the axial direction cannot be fixed. Thus, for a bearing assembly which includes a plurality of detached components, it is inconvenient for transportation and usage. Users have to assemble all these components together by themselves when need to use the bearing assembly.

SUMMARY

According to one embodiment of the present disclosure, a bearing assembly is provided. The bearing assembly includes: a housing having a through hole extending along an axial direction of the housing; a first bearing and a second bearing coaxially set in the through hole, wherein the second bearing is located at one end of the through hole, the first bearing is located at an other end of the through hole, and both the first bearing and the second bearing include an inner ring and an outer ring; a first shaft sleeve set between the first bearing and the second bearing along the axial direction; and an end cap located at the other end of the through hole, which is able to be connected with the housing and adapted to rotate relatively to the housing, wherein the first bearing is located between the end cap and the first shaft sleeve along the axial direction.

In some embodiments, the housing is configured with a first protrusion radially and inwardly extending from an inside wall of the housing; and the end cap is configured with a second protrusion radially and outwardly extending from an outside wall of the end cap, wherein the housing and the end cap are able to be connected together via the first protrusion and the second protrusion.

In some embodiments, one end of the end cap stands against the inner ring of the first bearing; and an other end of the end cap away from the first bearing is configured with an annular stopper which is radially and outwardly extended from the other end of the end cap, wherein the annular stopper and the housing define a gap therebetween along the axial direction, and are at least partially overlapped along the axial direction.

In some embodiments, the bearing assembly further includes a second shaft sleeve, wherein one end of the second shaft sleeve stands against the inner ring of the first bearing, and the end cap is located at an other end of the second shaft sleeve away from the first bearing.

In some embodiments, the end cap includes an annular cap body extending along a radial direction; a first folding part extending from an inner periphery of the cap body along the axial direction; and a second folding part extending from an outer periphery of the cap body along the axial direction, wherein the first folding part is held within the second shaft sleeve, and the second folding part is connected with the second protrusion.

In some embodiments, the housing is configured with an annular groove for accommodating the second protrusion, wherein the annular groove has an inner surface facing the first protrusion along the axial direction, the second protrusion is set between the first protrusion and the inner surface along the axial direction, and the second protrusion is adapted to move within the annular groove along the axial direction.

In some embodiments, the bearing assembly further includes an elastic element set in a space defined by the first shaft sleeve and the housing, wherein one end of the elastic element stands against the outer ring of the first bearing along the axial direction.

In some embodiments, the housing includes a first portion; a second portion for accommodating the first bearing, the elastic element and the end cap; and a third portion for accommodating the second bearing, wherein the second portion and the third portion are located at both ends of the first portion along the axial direction, the second portion has an inner diameter larger than that of the first portion to form a first shoulder at junction of the first portion and the second portion, and an other end of the elastic element stands against the first shoulder along the axial direction.

In some embodiments, the elastic element is a wave spring.

In some embodiments, the third portion has an inner diameter larger than that of the first portion to form a second shoulder at junction of the first portion and the third portion, and the outer ring of the second bearing stands against the second shoulder along the axial direction.

In some embodiments, the second portion is configured with a retainer radially and inwardly extending from an inside wall of the second portion, the retainer is located at an end of the second bearing away from the second shoulder, and stands against the outer ring of the second bearing.

In some embodiments, the bearing assembly further includes at least one conductive element, wherein the at least one conductive element radially runs through sidewall of the housing with one end in contact with the outer ring of the first bearing and an other end extending outside the housing.

Accordingly, the end cap can be connected with the housing for preventing the end cap from falling out of the housing, thus the bearing assembly is configured into a whole piece. Therefore, the bearing assembly is convenient for transportation and usage.

DETAILED DESCRIPTION OF THE PREFERRED EMBODIMENTS

In order to clarify the objects, characteristics and advantages of the present disclosure, embodiments of the present disclosure will be described in detail in conjunction with the accompanying drawings.

Figure 2:
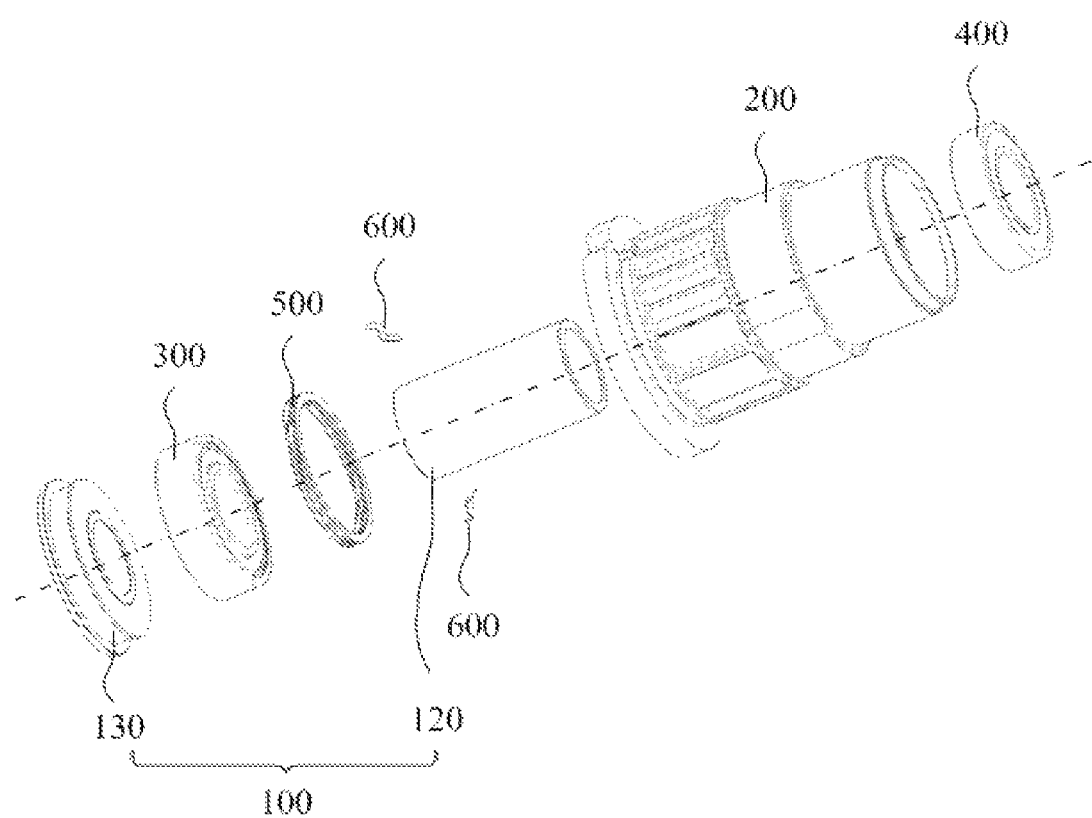
FIG. 2 schematically illustrates an exploded view of a bearing assembly according to one embodiment of the present disclosure.
Figure 3:
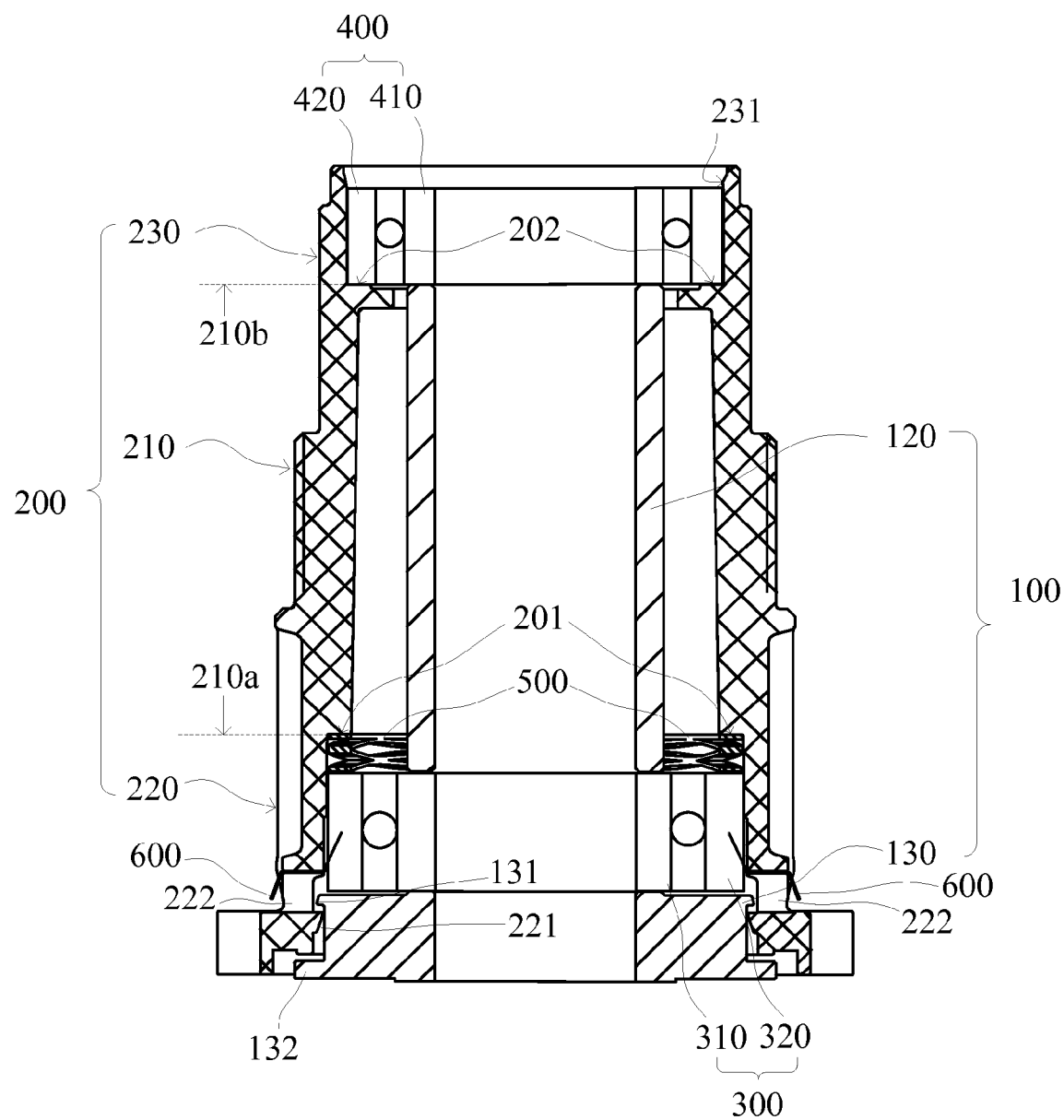
FIG. 3 schematically illustrates an axial section view of a bearing assembly according to one embodiment of the present disclosure.

Referring to FIG. 2 and FIG. 3, a bearing assembly according to one embodiment of the present disclosure is provided. The bearing assembly includes: a housing 200 having a cylindrical through hole (not labeled in FIG. 2 and FIG. 3) extending along an axial direction of the housing 200; a rotating part 100, a first bearing 300, and a second bearing 400 which are coaxially set within the through hole.

The rotating part 100 includes a first shaft sleeve 120 and an end cap 130 located at one end of the first shaft sleeve 120, wherein the first shaft sleeve 120 and the housing 200 define a space therebetween, and the end cap 130 can be connected with the housing 200.

The first bearing 300 and the second bearing 400 are respectively located at two ends of the first shaft sleeve 120 along the axial direction. The first bearing 300 and the second bearing 400 are also respectively located at two ends of the through hole. Both the first bearing 300 and the second bearing 400 include an inner ring and an outer ring. Along the axial direction, the first bearing 300 is set between the first shaft sleeve 120 and the end cap 130. In other words, the end cap 130 is set at the end of the through hole where the first bearing 300 located.

The first bearing 300 and the second bearing 400 may be deep groove ball bearings or any other type of bearing with an inner ring and an outer ring. In order to distinguishing inner rings and out rings of the first bearing and the second bearing, the inner ring of the first bearing 300 is defined as a first inner ring 310, the outer ring of the first bearing 300 is defined as a first outer ring 320; and the inner ring of the second bearing 400 is defined as a second inner ring 410, the outer ring of the second bearing 400 is defined as a second outer ring 420 (as shown in FIG. 3). In some embodiments, the first inner ring 310 of the first bearing 300 stands against the end cap 130.

Figure 1:
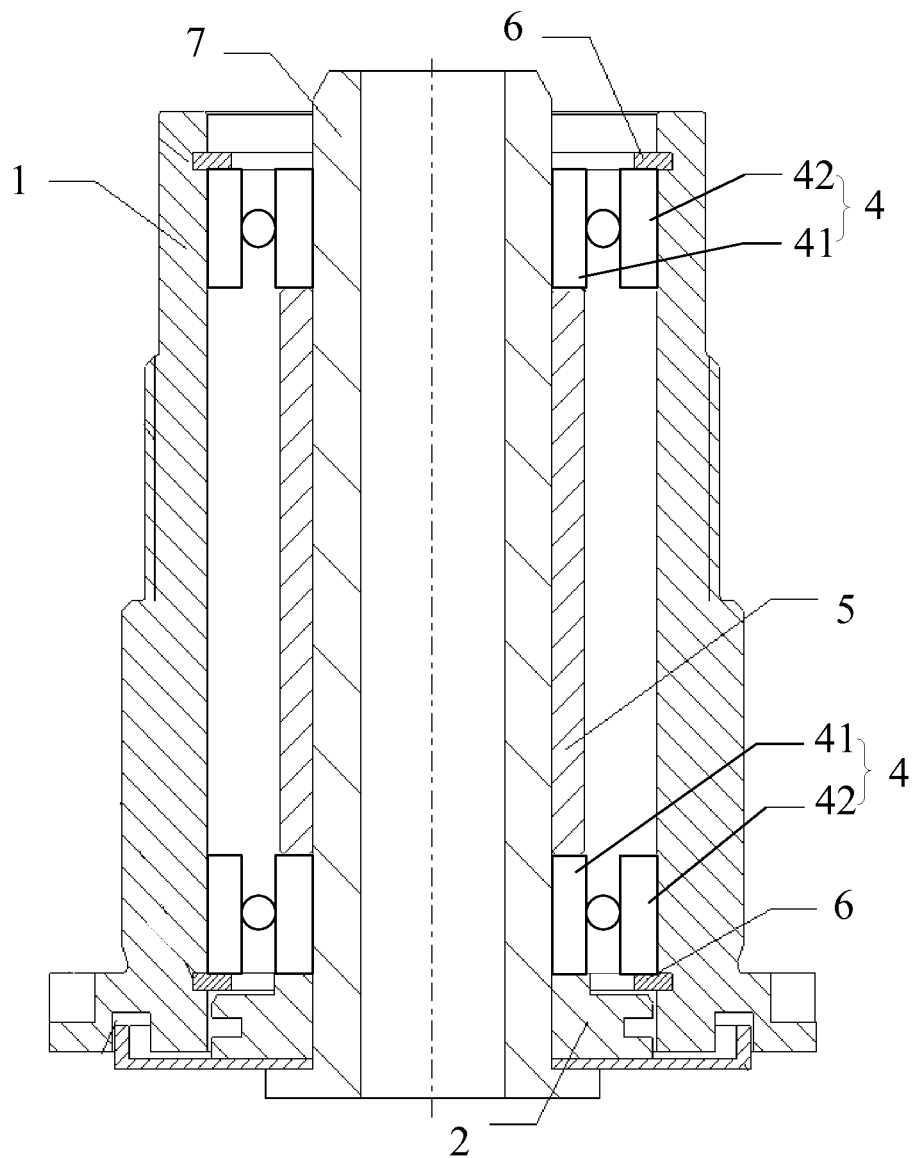
FIG. 1 schematically illustrates an axial section view of an existing bearing assembly.

During installation, a rotating shaft (not shown in FIG. 2 and FIG. 3, structure of the rotating shaft, and connection mode between the rotating shaft and the end cap are similar to that of the existing technologies, such as illustrated in FIG. 1) is employed to successively pass through the end cap 130, the first bearing 300, the first shaft sleeve 120, and the second bearing 400, so as to install the bearing assembly in the textile machinery (e.g. roving machine). After the bearing assembly is installed to the textile machinery, one end of the bearing assembly where the end cap 130 located is always facing downwardly, while the other end of the bearing assembly is always facing upwardly. Accordingly, gravity force of the entire bearing assembly has a direction parallel to the axis direction of the through hole.

In some embodiments, referring to FIG. 3, the housing 200 has a first portion 210, a second portion 220, and a third portion 230, which three parts form an integral component. The second portion 220 is located at a first end 210a of the first portion 210, which is adapted to accommodate the first bearing 300 and the end cap 130. The third portion 230 is located at a second end 210b of the first portion 210, which is adapted to accommodate the second bearing 400.

The second portion 220 of the housing 200 is configured with a first protrusion 221 on its inside wall, wherein the first protrusion 221 radially and inwardly extends from the inside wall of the housing. The end cap 130 is configured with a second protrusion 131 on its outside wall, wherein the second protrusion 131 radially and outwardly extends from the outside wall of the end cap 130. Along the axial direction, the second protrusion 131 is located between the first bearing 300 and the first protrusion 221. The first protrusion 221 and the second protrusion 131 are at least partially overlapped along the axial direction. In other words, projections of the first protrusion 221 and the second protrusion 131 on a plane perpendicular to the axial of through hole are at least partially overlapped. As such, when setting the end cap 130 into the housing 200, the first protrusion 221 of the housing 200 and the second protrusion 131 of the end cap 130 are able to be connected with each other. Thus, the end cap 130 will not slip out of the housing 200 along the axial direction. Therefore, the bearing assembly can be transported in the form of a whole piece, which is convenient in transportation and for user installation.

Along the axial direction, one end of the end cap 130 stands against the first inner ring 310 of the first bearing 300, and an other end of the end cap 130, which is located away from the first bearing 300, is configured with an annular stopper 132 which is outwardly and radially extended therefrom. The annular stopper 132 and an end of the housing 200 corresponding to the annular stopper 132 define a gap therebetween, along the axial direction. It should be noted that, the end of the housing 200 corresponding to the annular stopper 132 (hereafter referred to as corresponding end of the housing 200) refers to the end of the housing 200 where the annular stopper 132 located. The annular stopper 132 and sidewall of the corresponding end of the housing 200 are at least partially overlapped along the axial direction. In other words, there is a gap between the annular stopper 132 and the corresponding end of the housing 200 along the axial direction, and the annular stopper 132 has an external diameter larger than an inner diameter of the corresponding end of the housing 200.

When the rotating shaft passes through the bearing assembly from bottom to top, the rotating shaft has one end pressed against the end of the end cap 130 away from the first bearing 300. Thus, the rotating shaft imposes an upward force on the end cap 130. Therefore, under action of the upward force, the end cap 130 is able to move for certain distance along the axial direction. In this case, the first protrusion 221 and the second protrusion 131 are out of contact with each other, thus friction between the end cap 130 and the housing 200 is avoided when the end cap 130 is in rotation. Furthermore, the gap defined by the annular stopper 132 and the housing 200 along the axial direction shrinks, thus foreign matters, such as dust, are able to be prevented from accessing into the through hole. Therefore, the annular stopper 132 also exerts a sealing function.

In some embodiments, the first protrusion 221 is configured into two bulges, and the second protrusion 131 is configured into an annular element which is coaxial with the end cap 130. As such, the first protrusion 221 and the second protrusion 131 are at least partially overlapped along the axial direction.

In some embodiments, the second portion 220 of the housing 200 has two holes 222 formed on the sidewall of the housing 200, so as to reduce difficulties of forming the first protrusion 221. The first protrusion 221 is connected with sidewalls of the holes 222 and extends to an inner chamber defined by the second portion 220 of the housing 200. Specifically, the first protrusion 221 is located at a position of the sidewall of the hole 222 away from the first portion 210.

In some embodiments, the first protrusion 221 is configured into an annular element which is coaxial with the through hole, and the second protrusion 131 is configured into two or more bulges. It should be noted that, the present disclosure gives no limitation to the configurations of the first protrusion 221 and the second protrusion 131, as long as the second protrusion 131 can be connected with the first protrusion 221 when the end cap 130 in rotation.

In some embodiments, there is no such second protrusion 131 formed on the end cap 130. Instead, an annular groove corresponding to the first protrusion 221 is formed, wherein the first protrusion 221 extends into the annular groove. In some embodiments, there is no such first protrusion 221 formed on the housing 200. Instead, an annular groove corresponding to the second protrusion 131 is formed, wherein the second protrusion 131 extends into the annular groove. It should be noted that, ways of buckling the end cap 130 with the housing 200 are not limited to that recited above, some other suitable ways may be employed as along as the end cap and the housing can be bulked with each other and rotate with respect to each other.

In some embodiments, referring to FIG. 3, the second portion 220 of the housing 200 has an inner diameter larger than that of the first portion 210 of the housing 200, thus a first shoulder 201 is formed at junction of the first portion 210 and the second portion 220. An elastic element 500 is set between the first shoulder 201 and the first bearing 300. Along the axial direction, when the elastic element 500 is compressed, one end of the elastic element 500 is pressed against the first shoulder 201 and an other end of the elastic element 500 is pressed against the outer ring 320 of the first bearing 300, wherein the first shoulder 201 provides a stable support for the elastic element 500.

It can be seen from FIG. 3 that, the first bearing 300, the end cap 130 and the elastic element 500 are all set within the second portion 220. In other words, a housing bore is formed by the second portion 220, which is adapted to accommodate the first bearing 300, the end cap 130 and the elastic element 500.

The elastic element 500 is able to be any element with elasticity, such as a spring or any other elastomer. In some embodiments, the elastic element 500 is a wave spring sheathed outside the first shaft sleeve 120.

In some embodiments, the elastic element 500 is directly fixed to the inside wall of the housing 200.

Still with reference to FIG. 3, the third portion 230 has an inner diameter larger than that of the first portion 210, thus a second shoulder 202 is formed at junction of the first portion 210 and the third portion 230. The second bearing 400 is set within the third portion 230. In other words, another housing bore is formed by the third portion 230, which is adapted to accommodate the second bearing 400. Along the axial direction, the second inner ring 420 of the second bearing 400 stands against the second shoulder 202.

The second shoulder 202 has a radial dimension large enough to provide a support to the second bearing 400. At the same time, the second shoulder 202 is not in contact with the first shaft sleeve 120, so as to enable a normal rotation of the first shaft sleeve 120.

The third portion 230 of the housing 200 is configured to have a retainer 231 inwardly and radially extended from an inside wall of the third portion 230. Along the axial direction, the second outer ring 420 of the second bearing 400 is held between the second shoulder 202 and the retainer 231. Thus, position of the second bearing 400 is fixed along the axial direction.

In some embodiments, the retainer 231 is configured to be an annular ring which is coaxial with the through hole. In some embodiments, the retainer 231 is configured into a plurality of bumps arranged along circumference direction of the inside wall of the third portion 230.

Accordingly, both ends of each component set inside the housing 200 are respectively limited by the first protrusion 221 and the retainer 231 along the axial direction. Thus, all these components are retained inside the housing 200 and unable to slip out of the housing 200.

When the bearing assembly is installed to the textile machinery, force analysis of the first bearing 300 is as following.

Regarding the first bearing 300, along the axial direction, one end of the first inner ring 310 of the first bearing 300 is pressed against the end cap 130, thus the end cap 130 imposes a force F1 on the first inner ring 310, wherein the force F1 has a direction opposite to that of the gravity. Furthermore, one end of the first outer ring 320 of the first bearing 300 is pressed against the elastic element 500, thus the elastic element 500 imposes a force F1' on the first outer ring 320, wherein the force F1' has a direction same with that of the gravity.

It can be seen that, one end of the first bearing is applied with the force F1 which is imposed on the first inner ring 310 of the first bearing 300 by the end cap 130, and an other end of the first bearing is applied with the force F1' which is imposed on the first outer ring 320 of the first bearing 300 by the elastic element 500, wherein directions of the force F1 and the force F1' are opposite to each other. Thus, relative movement, along the axial direction, between the first inner ring 310 and the first outer ring 320 is able to be avoided. Therefore, axial internal clearance of the first bearing 300 can be eliminated.

Similarly, force analysis of the second bearing 400 is as following.

Along the axial direction, the second outer ring 420 of the second bearing 400 is pressed against the second shoulder 202, thus the second shoulder 202 imposes a force F2 on the second outer ring 420, wherein the force F2 has a direction opposite to that of the gravity.

When the bearing assembly is installed to the textile machinery, the rotating shaft and the second inner ring 410 of the second bearing 400 are connected by way of interference fit. Gravity force of the rotating shaft is transferred to the second inner ring 410, thus a force F2' is imposed on the second inner ring 410 by the rotating shaft, wherein the force F2' has a direction same with that of the gravity.

It can be seen that, one end of the second bearing 400 is applied with the force F2 which is imposed on the second inner ring 410 of the second bearing 400 by the second shaft shoulder 202, an other end of the second bearing 400 is applied with the force F2' which is imposed on the second outer ring 420 of the second bearing 400 by the rotating shaft, wherein directions of the force F2 and the force F2' are opposite to each other. Thus, relative movement, along the axial direction, between the second inner ring 410 and the second outer ring 420 is able to be avoided. Therefore, axial internal clearance of the second bearing 400 can be eliminated.

In some embodiments, referring to FIG. 2 and FIG. 3, the bearing assembly further includes two conductive elements 600 connected with the housing 200 and facing the first bearing 300 along the radial direction. Each of the conductive elements 600 runs through the sidewall of the housing 200 along the radial direction, which has one end in contact with the first outer ring 320 of the first bearing 300, and an other end extending outside the housing 200. The conductive element 600 is able to be configured into any form as long as it can achieve static conduction, such as a sheet metal, so as to lead out static electric generated inside the bearing assembly, and prevent the first outer ring 320 of the first bearing 300 from rotating.

In some embodiments, the conductive elements 600 correspond to the holes 222 respectively. Specifically, the conductive elements 600 respectively pass through the holes 222, so as to run through the sidewall of the housing 200 and in contact with the first outer ring 320 of the first bearing 300.

It should be noted that, the number of the conductive element 600 is not limited to two as recited above. In practice, there may be any number of conductive elements 600 according to actual needs.

In some embodiments, the housing 200 is made of plastic, and formed by way of integral molding. Thus, the housing 200 provided by the present disclosure is simpler in manufacturing, lighter in weight, and lower in cost, in comparison with conventional housings made of steel.

Figure 4:
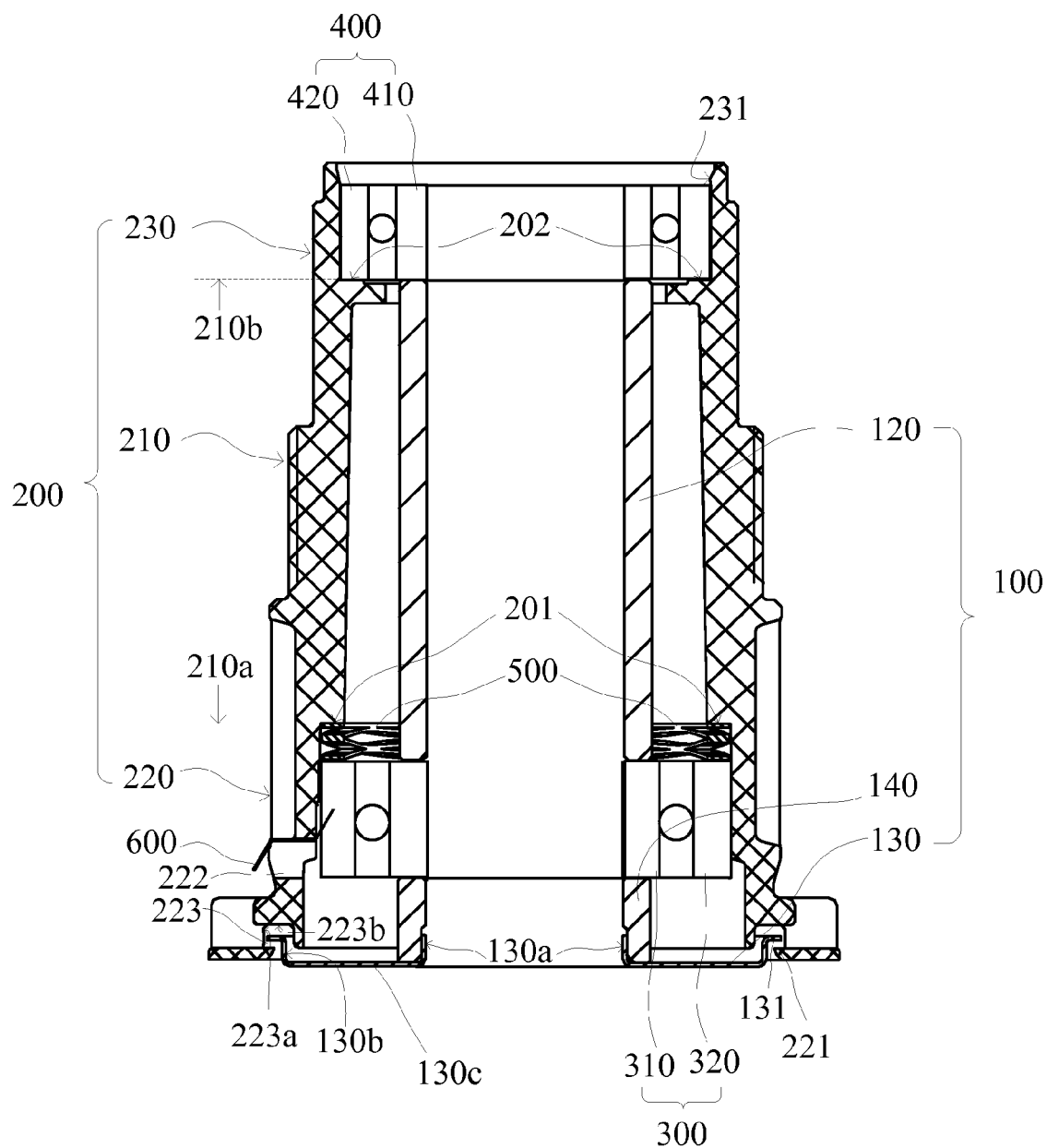
FIG. 4 schematically illustrates an axial section view of a bearing assembly according to another embodiment of the present disclosure.

Referring to FIG. 4, another bearing assembly according to one embodiment of the present disclosure is illustrated, which is similar to the bearing assembly recited above relating to FIG. 3, except the following features. Specifically, the rotating portion 100 further includes a second shaft sleeve 140. The second shaft sleeve 140 is set within the second portion 220 of the housing 200 at a position between the first inner ring 310 of the first bearing 300 and the end cap 130 along the axial direction. In other words, along the axial direction, the first bearing 300 is set between the first shaft sleeve 120 and the second shaft sleeve 140.

Along the axial direction, the first inner ring 310 of the first bearing 300 is pressed, under action of the elastic element 500, against the end cap 130 through the second shaft sleeve 140. Due to the configuration of the second shaft sleeve 140, axial dimension of the end cap 130 can be reduced, thus weight and cost of the end cap 130 are reduced as well.

Furthermore, the second shaft sleeve 140 extends, along the axial direction, to an end surface of the second portion 220 away from the first portion 210. As such, the second shaft sleeve 140 extends to a position align with the end surface of the second portion 220 away from the first portion 210. In this case, the end cap 130 is in sheet form. It should be noted that, in some embodiments, the second shaft sleeve 140 just extends to a position close to rather than align with the end surface of the second portion 220 away from the first portion 210. In other words, the axial dimension of the second shaft sleeve 140 should not be taken as a limitation of the present disclosure.

Continually referring to FIG. 4, the end cap 130 includes an annular cap body 130c extending along the radial direction, a first folding part 130a connected with an inner periphery of the annular cap body 130c, and a second folding part 130b connected with an outer periphery of the annular cap body 130c.

The annular cap body 130c is coaxial with the through hole of the housing 200. The first folding part 130a is held within the second shaft sleeve 140, thus position of the end cap 130 along the radial direction is limited by the second shaft sleeve 140. The second protrusion 131 of the end cap 130 is connected with the second folding part 130b and extends from the second folding part 130b along the radial direction.

In some embodiments, the first folding part 130a and the second folding part 130b are both in annular shape, and both extend along the axial direction.

In some embodiments, the first folding part 130a is configured to include a plurality of bumps arranged along circumferential direction. In some embodiments, extending trajectories of the first folding part 130a and the second folding part 130b are not strictly along the axial direction, as long as they have two ends along the axial direction, the first folding part can be held within the second shaft sleeve, and the second folding part is configured with the second protrusion.

Accordingly, in comparison with the embodiment illustrated in FIG. 3, the end cap 130 has a smaller axial dimension, and the second protrusion 131 is set at a position closer to an end of the second portion 220 away from the first portion 210 along the axial direction. Correspondingly, the first protrusion 221 is also set at a position closer to end of the second portion 220 away from the first portion 210 along the axial direction. As such, the first protrusion 221 is not configured to be connected with sidewalls of the holes 222 as illustrated in FIG. 3. The configuration of the first protrusion 221 is as following.

The housing 200 is configured with an annular groove 223 at the end of the housing 200 close to the end cap 130 along the axial direction, for accommodating the second protrusion 131, wherein the annular groove 223 is coaxial with the through hole. The annular groove 223 has an inner surface 223b extending along the radial direction and two side surfaces extending along the axial direction. The first protrusion 221 is connected with the side surface 223a of the annular groove 223, wherein the side surface 223a is located at an outer position with respect to the other side surface of annular groove 223 along the radial direction. Along the axial direction, the first protrusion 221 and the inner surface 223b are set face to face, the second protrusion 131 is set between the first protrusion 221 and the inner surface 223b, and the second protrusion 131 is able to move in the annular groove 223 along the axial direction. The annular groove 223 not only provides an accommodation to the second protrusion 131, but also forms a seal structure along with the second protrusion 131 so as to prevent foreign matters, such as dust, from accessing into the through hole.

In some embodiments, the holes 222 and the conductive elements 600 are set at positions closer to the first portion 210.

In some embodiments, there is one conductive element 600. In some embodiments, there are two or more conductive elements 600. The present disclosure gives no limitation to the number of the conductive element.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A bearing assembly, comprising:
   a housing having a through hole extending along an axial direction of the housing;
   a first bearing and a second bearing coaxially set within the through hole, wherein the second bearing is located at one end of the through hole, the first bearing is located at an other end of the through hole, and each of the first bearing and the second bearing comprise an inner ring and an outer ring;
   a first shaft sleeve set between the first bearing and the second bearing along the axial direction; and
   an end cap located at the other end of the through hole, which is able to be connected with the housing and adapted to rotate relatively to the housing, wherein the first bearing is located between the end cap and the first shaft sleeve along the axial direction, the housing is configured with a first protrusion radially and inwardly extending from an inside wall of the housing; and the end cap is configured with a second protrusion radially and outwardly extending from an outside wall of the end cap, wherein the first protrusion and the second protrusion overlap in the axial direction and the housing and the end cap are able to be connected together via the first protrusion and the second protrusion.

2. The bearing assembly according to claim 1, wherein one end of the end cap stands against the inner ring of the first bearing; and an other end of the end cap away from the first bearing is configured with an annular stopper which is radially and outwardly extended from the other end of the end cap, wherein the annular stopper and the housing define a gap therebetween along the axial direction, and the first protrusion, the second protrusion, and the annular stopper at least partially overlap one another along the axial direction.

3. The bearing assembly according to claim 1, further comprising a second shaft sleeve, wherein one end of the second shaft sleeve stands against the inner ring of the first bearing, and the end cap is located at an other end of the second shaft sleeve away from the first bearing.

4. The bearing assembly according to claim 1, further comprising an elastic element set in a space defined by the first shaft sleeve and the housing, wherein one end of the elastic element stands against the outer ring of the first bearing along the axial direction.

5. The bearing assembly according to claim 4, wherein the elastic element is a wave spring.

6. The bearing assembly according to claim 1, further comprising at least one conductive element, wherein the at least one conductive element radially runs through a sidewall of the housing with one end in contact with the outer ring of the first bearing and an other end extending outside the housing.

7. A bearing assembly, comprising:
   a housing having a through hole extending along an axial direction of the housing;
   a first bearing and a second bearing coaxially set within the through hole, wherein the second bearing is located at one end of the through hole, the first bearing is located at an other end of the through hole, and each of the first bearing and the second bearing comprise an inner ring and an outer ring;
   a first shaft sleeve set between the first bearing and the second bearing along the axial direction; and
   an end cap located at the other end of the through hole, which is able to be connected with the housing and adapted to rotate relatively to the housing, wherein the first bearing is located between the end cap and the first shaft sleeve along the axial direction,
   wherein the housing is configured with a first protrusion radially and inwardly extending from an inside wall of the housing; and the end cap is configured with a second protrusion radially and outwardly extending from an outside wall of the end cap, wherein the housing and the end cap are able to be connected together via the first protrusion and the second protrusion,
   further comprising a second shaft sleeve, wherein one end of the second shaft sleeve stands against the inner ring of the first bearing, and the end cap is located at an other end of the second shaft sleeve away from the first bearing, wherein the end cap comprises an annular cap body extending along a radial direction; a first folding part extending from an inner periphery of the cap body along the axial direction; and a second folding part extending from an outer periphery of the cap body along the axial direction, wherein the first folding part is held within the second shaft sleeve, and the second folding part is connected with the second protrusion.

8. The bearing assembly according to claim 7, wherein the housing is configured with an annular groove for accommodating the second protrusion, wherein the annular groove has an inner surface facing the first protrusion along the axial direction, the second protrusion is set between the first protrusion and the inner surface along the axial direction, and the second protrusion is adapted to move within the annular groove along the axial direction.

9. A bearing assembly, comprising:
   a housing having a through hole extending along an axial direction of the housing;
   a first bearing and a second bearing coaxially set within the through hole, wherein the second bearing is located at one end of the through hole, the first bearing is located at an other end of the through hole, and each of the first bearing and the second bearing comprise an inner ring and an outer ring;
   a first shaft sleeve set between the first bearing and the second bearing along the axial direction; and
   an end cap located at the other end of the through hole, which is able to be connected with the housing and adapted to rotate relatively to the housing, wherein the first bearing is located between the end cap and the first shaft sleeve along the axial direction,
   further comprising an elastic element set in a space defined by the first shaft sleeve and the housing, wherein one end of the elastic element stands against the outer ring of the first bearing along the axial direction
   wherein the housing comprises a first portion; a second portion for accommodating the first bearing, the elastic element and the end cap; and a third portion for accommodating the second bearing, wherein the second portion and the third portion are respectively located at two ends of the first portion along the axial direction, the second portion has an inner diameter larger than that of the first portion to form a first shoulder at junction of the first portion and the second portion, and an other end of the elastic element stands against the first shoulder along the axial direction.

10. The bearing assembly according to claim 9, wherein the third portion has an inner diameter larger than that of the first portion to form a second shoulder at junction of the first portion and the third portion, and the outer ring of the second bearing stands against the second shoulder along the axial direction.

11. The bearing assembly according to claim 10, wherein the second portion is configured with a retainer radially and inwardly extending from an inside wall of the second portion, the retainer is located at one end of the second bearing away from the second shoulder, and stands against the outer ring of the second bearing.

* * * * *